(12) United States Patent
Chambers

(10) Patent No.: US 11,959,276 B1
(45) Date of Patent: Apr. 16, 2024

(54) CAN PLAZA AND PROCESS FOR MAKING THE SAME

(71) Applicant: Gary L Chambers, Fort Worth, TX (US)

(72) Inventor: Gary L Chambers, Fort Worth, TX (US)

( * ) Notice: Subject to any disclaimer, the term of this patent is extended or adjusted under 35 U.S.C. 154(b) by 33 days.

(21) Appl. No.: 17/157,556

(22) Filed: Jan. 25, 2021

(51) Int. Cl.
| | |
|---|---|
| *E04C 1/39* | (2006.01) |
| *B64F 1/20* | (2006.01) |
| *E04B 1/04* | (2006.01) |
| *E04G 15/00* | (2006.01) |
| *H02G 9/02* | (2006.01) |

(52) U.S. Cl.
CPC ............ *E04C 1/397* (2013.01); *B64F 1/205* (2013.01); *E04B 1/04* (2013.01); *E04G 15/00* (2013.01); *H02G 9/025* (2013.01); *E04B 2103/02* (2013.01)

(58) Field of Classification Search
CPC .. E04C 1/39; E04C 1/397; H02G 9/00; H02G 9/02; H02G 9/025; B64F 1/205; B64F 1/20; B64F 1/18; E04G 15/00; E04B 1/04; E04B 2103/02; E04B 5/36
See application file for complete search history.

(56) References Cited

U.S. PATENT DOCUMENTS 1,791,645 A * 2/1931 Sproul .................... E04G 15/00
249/35

FOREIGN PATENT DOCUMENTS

| CN | 1851182 A | * | 10/2006 |
| CN | 1932188 A | * | 3/2007 |
| CN | 100412284 C | * | 8/2008 |
| CN | 100412292 C | * | 8/2008 |
| CN | 100412294 C | * | 8/2008 |
| CN | 100422454 C | * | 10/2008 |
| CN | 100441814 C | * | 12/2008 |
| CN | 100455755 C | * | 1/2009 |
| CN | 101733838 A | * | 6/2010 |

* cited by examiner

*Primary Examiner* — Michael Safavi
(74) *Attorney, Agent, or Firm* — Plager Schack LLP; Mark H. Plager; Michael J. O'Brien

(57) ABSTRACT

A can plaza assembly is configured to provide electrical distribution at a location. The can plaza has a box, further comprising a side wall opening and joined to a lid. A plurality of cans is arranged inside the can plaza. Conduits project outward from each can. Fittings are joined to the conduit and extend through the side wall opening of the box. Foam fills the box around the cans and the conduits, such that the foam does not completely cover the cans. Rebar is arranged twelve inches on center each way from the cans on top of the foam. Concrete fills upon the rebar and foam up to an upper edge of the can. Electrical wires are routed through the conduits and cans provide the electrical distribution at the location.

2 Claims, 3 Drawing Sheets

CAN PLAZA AND PROCESS FOR MAKING THE SAME

BACKGROUND

The embodiments herein relate generally to construction and civil engineering.

On an airport runway, electrical conduit, grounding and cabling is housed in multiple concrete junction can plazas. Each can plaza has openings on each side of a precast concrete foundation that allows cables to be joined in an intricate pattern under taxiways and runways. The can plaza routes power cables up through each round can, so electricity can be networked to lighted directional signs and elsewhere.

Prior to embodiments of the disclosed invention a can plaza was too heavy to prefabricate. Some locations have sporadic appropriate weather for installing can plazas. This creates access denial delays. Embodiments of the disclosed invention solve this problem.

SUMMARY

A can plaza assembly is configured to provide electrical distribution at a location. The can plaza has a box, further comprising a side wall opening and joined to a lid. A plurality of cans is arranged inside the can plaza. Conduits project outward from each can. Fittings are joined to the conduit and extend through the side wall opening of the box. Foam fills the box around the cans and the conduits, such that the foam does not completely cover the cans. Rebar is arranged twelve inches on center each way from the cans on top of the foam. Concrete fills upon the rebar and foam up to an upper edge of the can. Electrical wires are routed through the conduits and cans provide the electrical distribution at the location.

BRIEF DESCRIPTION OF THE FIGURES

The detailed description of some embodiments of the invention is made below with reference to the accompanying figures, wherein like numerals represent corresponding parts of the figures.

DETAILED DESCRIPTION OF CERTAIN EMBODIMENTS

By way of example, and referring to FIGS. 2-6, one embodiment of a can plaza assembly 10 further comprises a plaza 12 further comprising a lid 12*a* which rests upon a box 12*b* having an opening 12*c* on each side. The opening 12*c* is reinforced with reinforcement bats 12*d*.

To fabricate the can plaza assembly 10, a user first arranges a plurality of cans 14 into the box 12*b* such that the cans 14 sit about six inches higher than a lower surface of the box 12*b*. An upper edge of the box 12*b* has an upper form 18.

Figure 1:
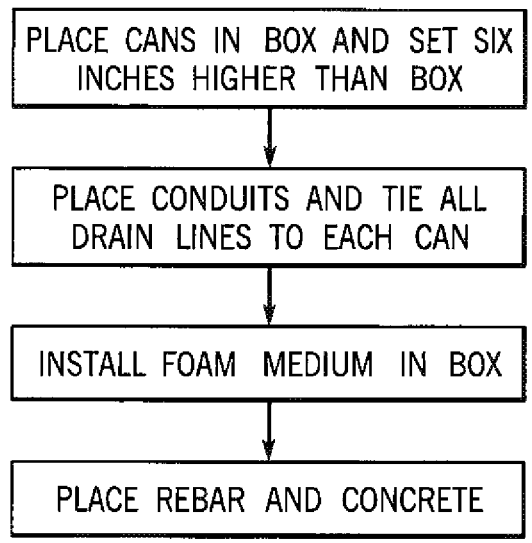
FIG. 1 shows a flow chart of one embodiment of the present invention.
Figure 2:
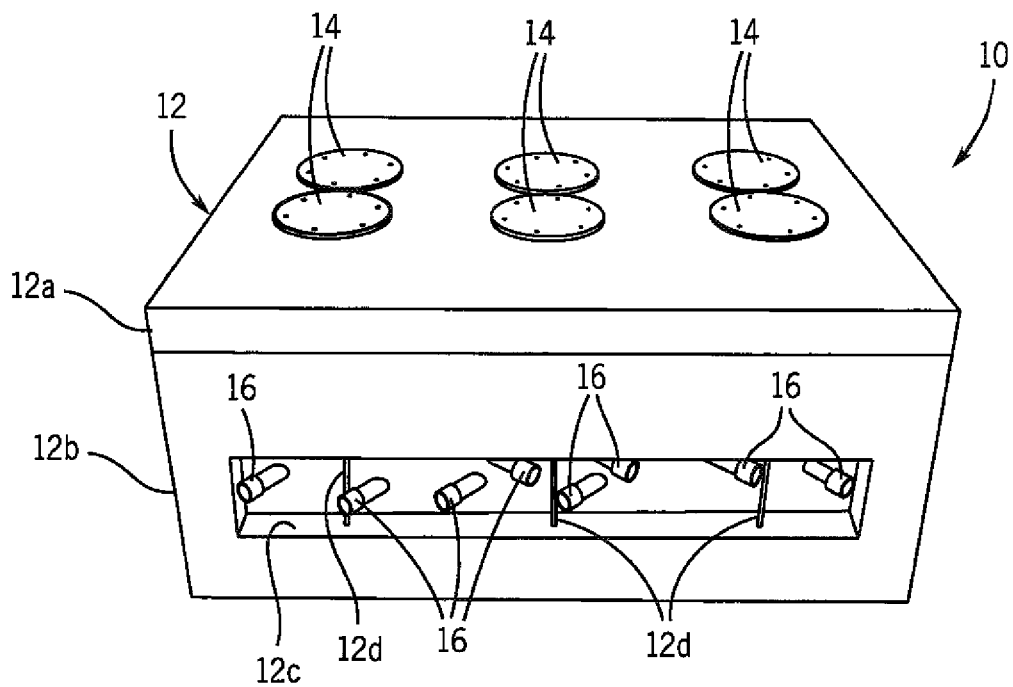
FIG. 2 shows a perspective view of one embodiment of the present invention.
Figure 3:
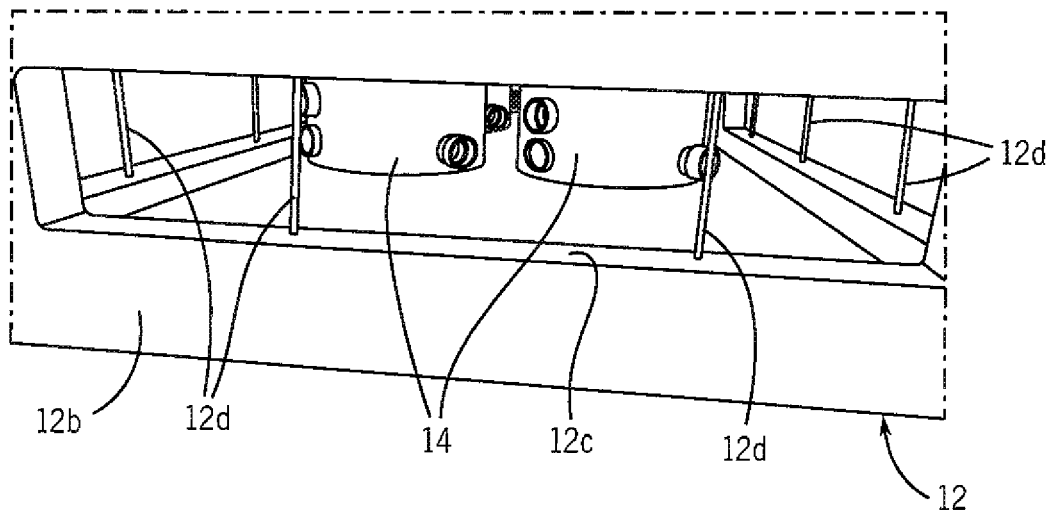
FIG. 3 shows a detail perspective view of one embodiment of the present invention.
Figure 4:
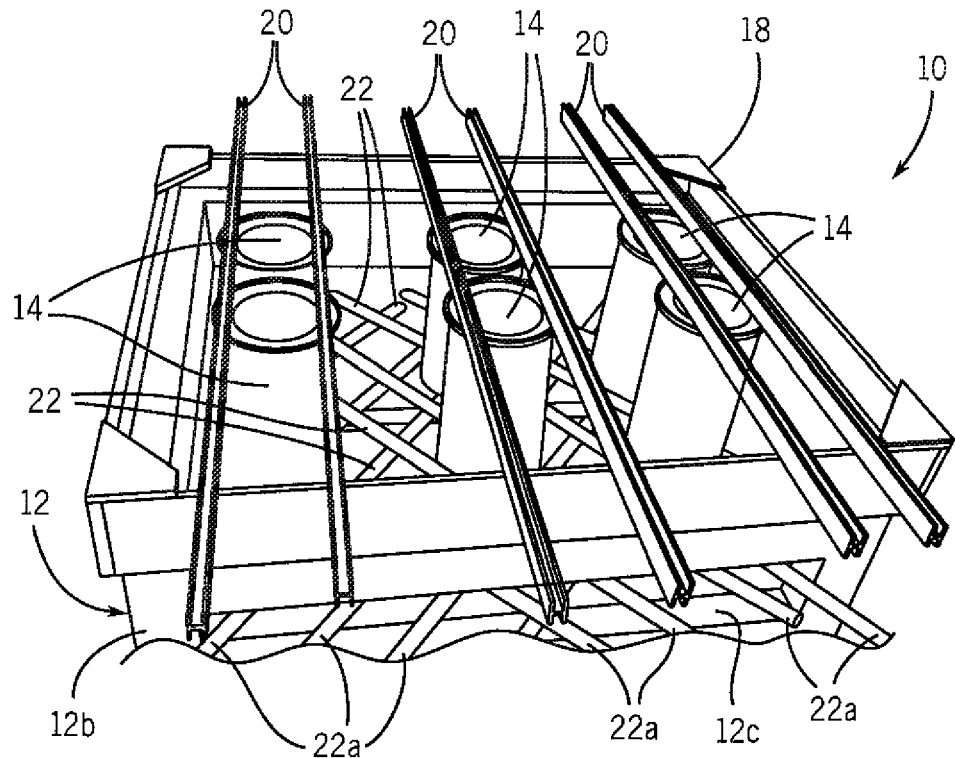
FIG. 4 shows a detail perspective view of one embodiment of the present invention.

At this point, the conduits 22 can be routed through the box 12*b*. The conduits have ends 22*a* that are covered with fittings 16. The plurality of cans 14 are aligned with transverse extrusions 20 as shown in FIG. 4.

Figure 5:
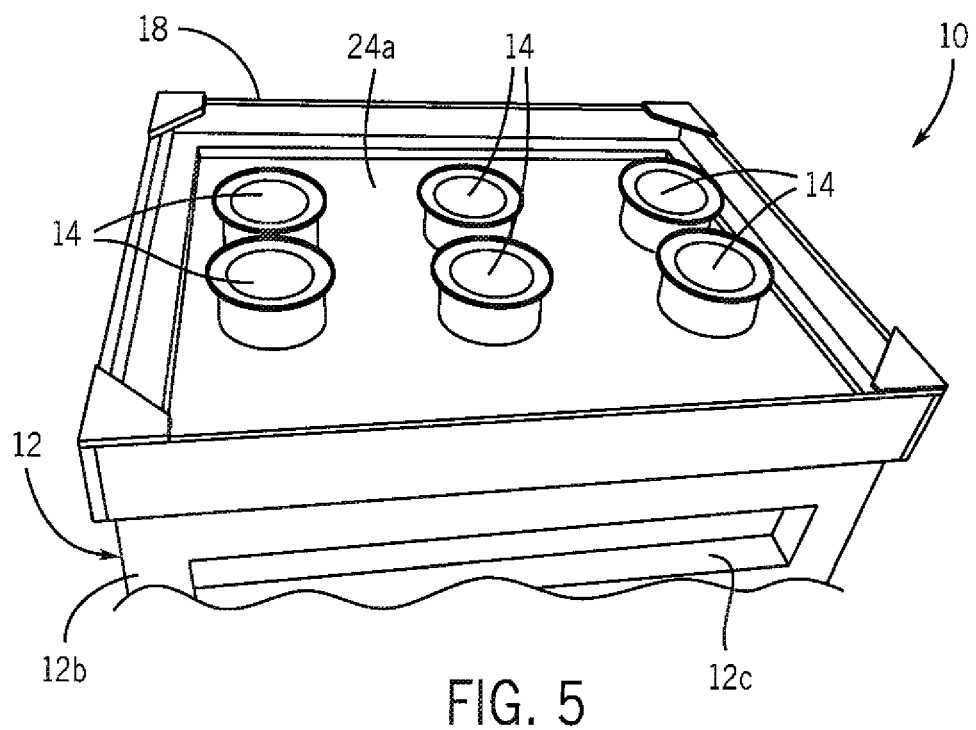
FIG. 5 shows a detail perspective view of one embodiment of the present invention.
Figure 6:
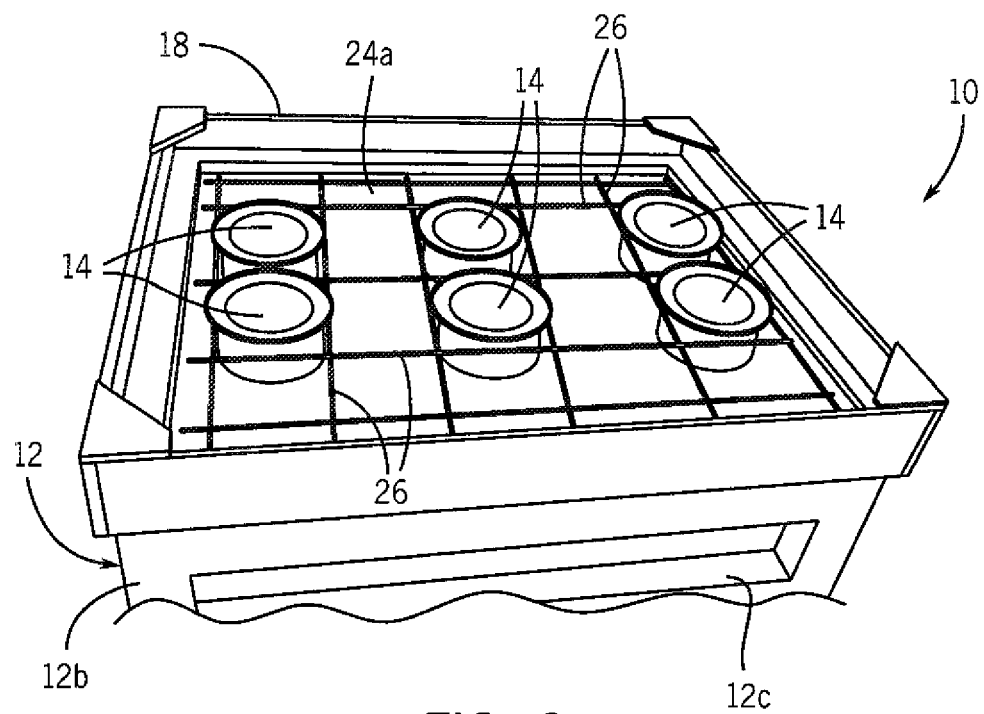
FIG. 6 shows a detail perspective view of one embodiment of the present invention.

Turning to FIG. 5, with the components arranged, foam 24*a* partially fills a lower portion of the box 12*b*. The transverse extrusions 20 are then removed. The upper rim of each of the plurality of cans 14 remains exposed. Turning to FIG. 6, rebar 26 is then arranged upon the foam 24*a*. Concrete fills the box 12*b* up to the upper form 18.

The use of the foam 24*a* from a lower edge of the box 12*b* to six inches beneath the upper form is critical. The use of spray foam holds the plurality of cans 14 in place and significantly reduces the weight of the can plaza assembly 10. This permits the can plaza assembly to be lighter and to be assembled offsite and then delivered where needed.

In some embodiments the cans are arranged 2 inches to 11 inches center to center. The cans are approximately 2½ inches apart from each other at the center line of the box and 1 inch from the edge of the box 12*b*.

As used in this application, "box" means a container with at least one sidewall. The container need not cubic or parallelepiped, as other shapes including those with rounded edges and a round sidewall can be used as well.

As used in this application, the term "a" or "an" means "at least one" or "one or more."

As used in this application, the term "about" or "approximately" refers to a range of values within plus or minus 10% of the specified number.

As used in this application, the term "substantially" means that the actual value is within about 10% of the actual desired value, particularly within about 5% of the actual desired value and especially within about 1% of the actual desired value of any variable, element or limit set forth herein.

All references throughout this application, for example patent documents including issued or granted patents or equivalents, patent application publications, and non-patent literature documents or other source material, are hereby incorporated by reference herein in their entireties, as though individually incorporated by reference, to the extent each reference is at least partially not inconsistent with the disclosure in the present application (for example, a reference that is partially inconsistent is incorporated by reference except for the partially inconsistent portion of the reference).

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

Any element in a claim that does not explicitly state "means for" performing a specified function, or "step for" performing a specified function, is not to be interpreted as a "means" or "step" clause as specified in 35 U.S.C. § 112, ¶ 6. In particular, any use of "step of" in the claims is not intended to invoke the provision of 35 U.S.C. § 112, ¶ 6.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A can plaza assembly, configured to provide electrical distribution at a location; the can plaza comprising:
   a box, further comprising a side wall opening and joined to a lid
   a plurality of cans, arranged inside the can plaza;
   conduits, projecting outward from each can;
   fittings, joined to the conduit, and extending through the side wall opening of the box;
   foam, filling the box around the cans and the conduits, such that the foam does not completely cover the cans;
   rebar, arranged twelve inches on center each way from the cans on top of the foam;
   concrete, filled upon the rebar and foam up to an upper edge of the cans;
   wherein electrical wires, routed through the conduits and cans provide the electrical distribution at the location.

2. The can plaza assembly of claim 1, further comprising a top form to be placed at an upper edge of the box; wherein the concrete is filled up to the top form during fabrication of the can plaza assembly.

* * * * *